US008406091B2

(12) United States Patent
Shimazawa et al.

(10) Patent No.: US 8,406,091 B2
(45) Date of Patent: Mar. 26, 2013

(54) THERMAL ASSISTED MAGNETIC RECORDING HEAD HAVING INTEGRAL MOUNTED OF PHOTO-DETECTOR AND LASER DIODE

(75) Inventors: Koji Shimazawa, Tokyo (JP); Kosuke Tanaka, Tokyo (JP); Eiji Komura, Tokyo (JP); Takashi Honda, Shatin (HK)

(73) Assignee: TDK Corporation, Tokyo (JP)

( * ) Notice: Subject to any disclaimer, the term of this patent is extended or adjusted under 35 U.S.C. 154(b) by 66 days.

(21) Appl. No.: 12/832,593

(22) Filed: Jul. 8, 2010

(65) Prior Publication Data

US 2012/0008470 A1    Jan. 12, 2012

(51) Int. Cl.
*G11B 11/00*    (2006.01)
(52) U.S. Cl. .................................. 369/13.33; 369/13.13
(58) Field of Classification Search ............... 369/13.13,
369/13.33, 13.32, 13.02, 112.09, 112.14,
369/112.21, 112.27; 360/59; 385/129, 31,
385/88–94; 250/201.3, 201.5
See application file for complete search history.

(56) References Cited

U.S. PATENT DOCUMENTS

| | | | |
|---|---|---|---|
| 5,481,082 A | 1/1996 | Yamamoto | |
| 6,687,196 B1 * | 2/2004 | Ueyanagi | 369/13.33 |
| 7,372,648 B2 * | 5/2008 | Akiyama et al. | 369/13.33 |
| 7,538,978 B2 | 5/2009 | Sato et al. | |
| 7,821,880 B2 * | 10/2010 | Tanaka et al. | 369/13.33 |
| 7,852,587 B2 * | 12/2010 | Albrecht et al. | 360/59 |
| 2002/0186642 A1 * | 12/2002 | Shimano et al. | 369/13.33 |
| 2005/0213436 A1 | 9/2005 | Ono et al. | |
| 2008/0043360 A1 | 2/2008 | Shimazawa et al. | |
| 2008/0056073 A1 | 3/2008 | Shimizu | |
| 2009/0052078 A1 | 2/2009 | Tanaka et al. | |
| 2010/0007980 A1 * | 1/2010 | Kim et al. | 360/59 |
| 2010/0118666 A1 * | 5/2010 | Mihara | 369/13.33 |
| 2010/0238580 A1 * | 9/2010 | Shimazawa et al. | 360/59 |
| 2011/0128827 A1 * | 6/2011 | Shimazawa et al. | 369/13.02 |
| 2011/0157738 A1 * | 6/2011 | Shimazawa et al. | 360/59 |
| 2011/0228653 A1 * | 9/2011 | Shimazawa et al. | 369/13.32 |
| 2012/0044790 A1 * | 2/2012 | Shimazawa et al. | 369/13.32 |

FOREIGN PATENT DOCUMENTS

JP      A-2009-301597      12/2009

OTHER PUBLICATIONS

Rottmayer, R. et al., "Heat-Assisted Magnetic Recording," IEEE Transactions on Magnetics, Oct. 10, 2006, pp. 2417-2421, vol. 42, No. 10.
U.S. Appl. No. 12/728,510, filed Mar. 22, 2010, in the name of Koji Shimazawa et al.

* cited by examiner

*Primary Examiner* — Tan X Dinh
(74) *Attorney, Agent, or Firm* — Oliff & Berridge, PLC

(57) ABSTRACT

Provided is a thermally-assisted magnetic recording head in which a slider including an optical system is joined with a light source unit. The light source unit comprises: a unit substrate including a joining surface joined with the slider and a source-installation surface adjacent to the joining surface; a light source provided in the source-installation surface and emits light for thermal assist; and a photodetector section formed inside the unit substrate, a light-receiving portion of the photodetector section for receiving light emitted from a rear light-emission center being located on the source-installation surface side. The light source unit includes the photodetector section that enables constant monitoring of light output from the light source. Accordingly, feedback adjustment of the light output can be accomplished. Further, since the rear light-emission center and the light-receiving portion can be located sufficiently close to each other, the light output can be monitored with a higher efficiency.

14 Claims, 8 Drawing Sheets

THERMAL ASSISTED MAGNETIC RECORDING HEAD HAVING INTEGRAL MOUNTED OF PHOTO-DETECTOR AND LASER DIODE

BACKGROUND OF THE INVENTION

1. Field of the Invention

The present invention relates to a thermally-assisted magnetic recording head constituted by joining a light source unit including a light source for emitting light used for thermally-assisted magnetic recording and a slider. The present invention further relates to a head gimbal assembly (HGA) including the head, and to a magnetic recording apparatus including the HGA.

2. Description of the Related Art

With the explosion in the use of the Internet in these years, a huge amount of data that are incommensurably larger than ever are stored and used on computers such as servers and information processing terminals. This trend is expected to further grow at an accelerated rate. Under these circumstances, demand for magnetic recording apparatuses such as magnetic disk apparatuses as mass storage is growing, and the demand for higher recording densities of the magnetic recording apparatuses is also escalating.

In the magnetic recording technology, it is necessary for magnetic heads to write smaller recording bits on magnetic recording media in order to achieve higher recording densities. In order to stably form smaller recording bits, perpendicular magnetic recording technology has been commercially implemented in which components of magnetization perpendicular to the surface of a medium are used as recording bits. In addition, thermally-assisted magnetic recording technology that enables the use of magnetic recording media having higher thermal stability of magnetization is being actively developed.

In the thermally-assisted magnetic recording technology, a magnetic recording medium formed of a magnetic material with a large energy $K_U$ is used so as to stabilize the magnetization, then anisotropic magnetic field of a portion of the medium, where data is to be written, is reduced by heating the portion; just after that, writing is performed by applying write field to the heated portion. Actually, there has been generally used a method in which a magnetic recording medium is irradiated and thus heated with a light such as near-field light (NF-light). In this case, it is significantly important where and how a light source with a sufficiently high light output should be disposed inside a head in order to stably supply a light with a sufficiently high intensity at a desired position on the magnetic recording medium.

As for the setting of the light source, for example, U.S. Pat. No. 7,538,978 B2 discloses a configuration in which a laser unit including a laser diode is mounted on the back surface of a slider, and US Patent Publication No. 2008/0056073 A1 discloses a configuration in which a structure of a laser diode element with a monolithically integrated reflection mirror is mounted on the back surface of a slider. Further, US Patent Publication No. 2005/0213436 A1 discloses a structure of slider that is formed together with a semiconductor laser, and Robert E. Rottmayer et al. "Heat-Assisted Magnetic Recording" IEEE TRANSACTIONS ON MAGNETICS, Vol. 42, No. 10, p. 2417-2421 (2006) discloses a configuration in which a diffraction grating is irradiated with a light generated from a laser unit provided within a drive apparatus.

Furthermore, the present inventors propose a thermally-assisted magnetic recording head with a "composite slider structure" which is constituted by joining a light source unit provided with a light source to the end surface (back surface) of a slider provided with a write head element, the end surface being opposite to the opposed-to-medium surface of the slider. The "composite slider structure" is disclosed in, for example, US Patent Publication No. 2008/043360 A1 and US Patent Publication No. 2009/052078 A1.

While various forms of installation of a light source have been proposed, all of the laser diodes described above are devices made of a semiconductor. Outputs of semiconductor devices vary in response to changes in ambient temperature. In particular, ambient temperatures that are assumed in environments in which magnetic disk apparatuses are used are in the range of −5 to 60° C., for example. Accordingly, the range of variations of light output from the light source provided in a head should be estimated to be considerably wide. In addition, since changes in temperature of the light source due to heat radiated from surrounding elements and the light source itself are also considerably large, the range of variations in light output from the light source further widens. Therefore, in order to stably provide output light with a constant intensity at different temperatures, measures should be taken to detect changes in light output from the light source in real time and to keep the light output from the light source constant.

However, it is difficult to install a system for monitoring the light in an element-integration surface of a head for thermal assist together with an optical system that propagates the light for thermal assist, because of a limited area of the element-integration surface. In practice, femto sliders are commonly used as head slider substrates. The area of the element-integration surface of the femto slider is as small as 230 micrometers (µm)×700 µm. In these circumstances, little has been done to monitor light output from the light source for thermal assist.

In addition, a monitoring system provided in a magnetic head needs to be prevented from increasing the air resistance of the magnetic head to disturb a current of air near the magnetic head while the magnetic head is flying above a magnetic recording medium. However, little has been done to prevent such increase in the air resistance.

SUMMARY OF THE INVENTION

Some terms used in the specification will be defined before explaining the present invention. In a layered structure or an element structure formed in the element-integration surface of a slider substrate or in the source-installation surface of a unit substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and −Z side to a leading side. And Y-axis direction indicates a track width direction, and X-axis direction indicates a height direction.

According to the present invention, a thermally-assisted magnetic recording head is provided, in which a slider including an optical system configured to propagate light for thermal assist and provided in an element-integration surface of a slider substrate is joined with a light source unit. Here, the light source unit comprises:

a unit substrate including: a joining surface which faces the slider substrate when the light source unit is joined with the slider; and a source-installation surface adjacent to the joining surface;

a light source which is provided in the source-installation surface and emits light for thermal assist to be entered into the optical system; and a photodetector section formed inside the unit substrate and configured to measure an output from the light source, a light-receiving portion of the photodetector section being located on the source-installation surface side of the unit substrate and configured to receive light emitted from a rear light-emission center on a side opposite to a light-emission center of the light source, the light-emission center emitting light for thermal assist, a back surface of the slider substrate on a side opposite to an opposed-to-medium surface being joined to the joining surface of the unit substrate so that light emitted from the light-emission center enters the optical system.

In the thermally-assisted magnetic recording head according to the present invention, the photodetector section which enables constant monitoring of light output from the light source is provided, as described above. Accordingly, feedback adjustment of light output of the light source, which emits light for thermal assist, can be accomplished. Further, light output from the light source can be controlled by the adjustment in response to changes in the light output due to environmental influence or changes in the light output over time to stabilize the intensity of light for thermal assist with which a magnetic recording medium is irradiated. Consequently, a region of the magnetic recording medium where data is to be written can be properly and stably heated. Therefore, a good thermally-assisted magnetic recording can be accomplished.

Furthermore, the photodetector section is formed inside the unit substrate and the light-receiving portion is located on the source-installation surface side of the unit substrate so that the light-receiving portion can receive laser light emitted from the rear light-emission center of the light source. Accordingly, the rear light-emission center and the light-receiving portion can be located sufficiently close to each other so that light output from the light source can be monitored with a higher efficiency. In addition, since the monitoring system is contained inside the unit substrate in the light source unit, the light source unit has a less irregular general outline. This can avoid increase of air resistance of the thermally-assisted magnetic recording head which would significantly disturb an air current around the head while the head is flying above the magnetic recording medium.

In the thermally-assisted magnetic recording head according to the present invention, the photodetector section is preferably located on a rear side of the light source when viewed from the joining surface side of the unit substrate. Further, the photodetector section is preferably a semiconductor photodiode formed from a portion of the unit substrate, and is more preferably a PIN-type photodiode formed from a portion of the unit substrate. Here, a PIN-type photodiode includes a p-type semiconductor portion, an n-type semiconductor portion, and an intrinsic portion which is provided between the p-type semiconductor portion and the n-type semiconductor portion and has a very low impurity concentration. The provision of the intrinsic portion widens the width of a depletion layer in the PIN-type photodiode, and therefore parasitic capacitance can be minimized. Consequently, the PIN-type photodiode can achieve a higher sensitivity and a higher response speed compared with a PN-junction diode. Further, in the case that the photodetector section is a semiconductor photodiode formed from a portion of the unit substrate, it is preferable that an electrode connected electrically to a p-type semiconductor portion of the photodetector section and an electrode connected electrically to a n-type semiconductor portion of the photodetector section are provided in the source-installation surface of the unit substrate.

Furthermore, in the thermally-assisted magnetic recording head according to the present invention, it is preferable that the light source is an edge-emitting type laser diode, and a p-type electrode of the light source is bonded in the source-installation surface of the unit substrate. In this case, an electrode connected electrically to the p-type electrode of the light source is preferably provided in the source-installation surface of the unit substrate. And an adhesion layer for joining to the slider is also preferably provided in the joining surface of the unit substrate.

Furthermore, in the thermally-assisted magnetic recording head according to the present invention, an insulating layer for electrically insulating the unit substrate from the slider substrate is preferably provided on the back surface of the slider substrate on the side opposite to the opposed-to-medium surface. Further, it is also preferable that the insulating layer covers a light-receiving end surface of the optical system and functions as an antireflection means for light incident in the optical system from the light source.

According to the present invention, a head gimbal assembly (HGA) is further provided, which comprises: a suspension; and the above-described thermally-assisted magnetic recording head fixed on the suspension, a portion of the back surface of the slider substrate on the side opposite to the opposed-to-medium surface being bonded to the suspension, the suspension comprising an aperture, and the light source unit protruding through the aperture on a side opposite to the slider with respect to the suspension.

In the HGA of present invention, it is preferable that a wiring member for the light source and the photodetector section of the light source unit is provided on a surface of the suspension, and a wiring member for a write head element in the slider is provided on another surface of the suspension.

According to the present invention, a magnetic recording apparatus is further provided, which comprises: at least one head gimbal assembly as described above; at least one magnetic recording medium; and a control circuit configured to control light-emission operations of the light source by using a monitor output from the photodetector section, and to control write operations that the thermally-assisted magnetic recording head performs to the at least one magnetic recording medium.

Further objects and advantages of the present invention will be apparent from the following description of preferred embodiments of the invention as illustrated in the accompanying figures. In each figure, the same element as an element shown in other figure is indicated by the same reference numeral.

Further, the ratio of dimensions within an element and between elements becomes arbitrary for viewability.

DESCRIPTION OF THE PREFERRED EMBODIMENTS

Figure 1:
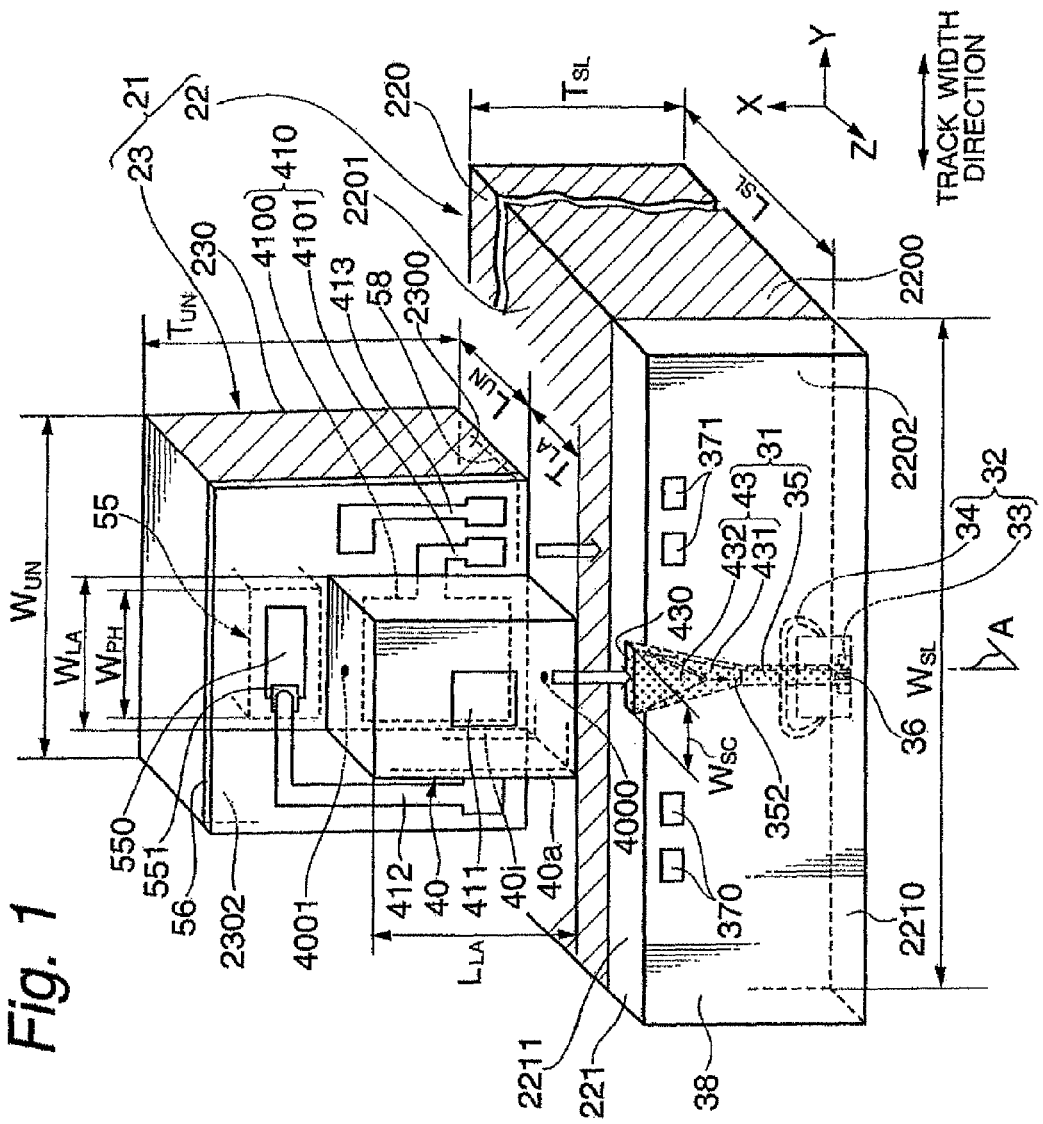
FIG. 1 shows a perspective view illustrating one embodiment of a thermally-assisted magnetic recording head according to the present invention.

FIG. 1 shows a perspective view illustrating one embodiment of a thermally-assisted magnetic recording head according to the present invention.

As shown in FIG. 1, a thermally-assisted magnetic recording head 21 is constituted by aligning and joining a light source unit 23, which includes a laser diode 40 as a light source and a photodiode section 55 as a photo-detecting part, and a slider 22, which includes an optical system 31.

The slider 22 includes: a slider substrate 220 having an air bearing surface (ABS) 2200 processed so as to provide an appropriate flying height; and a head element part 221 that includes an optical system 31 and is formed on an element-integration surface 2202 that is perpendicular to and adjacent to the ABS 2200. While, the light source unit 23 includes: a unit substrate 230 having an joining surface 2300; a laser diode 40 as a light source provided on a source-installation surface 2302 that is perpendicular to and adjacent to the joining surface 2300; and a photodiode section 55 formed within the unit substrate 230 and configured to measure and monitor the light output of the laser diode 40.

These slider 22 and light source unit 23 are bonded to each other in such a way that the back surface 2201 of the slider substrate 220 and the joining surface 2300 of the unit substrate 230 are opposed to each other and sandwich a solder layer 58 as an adhesion layer therebetween.

(Light Source Unit)

In the light source unit 23 as also shown in FIG. 1, the laser diode 40 can be a semiconductor diode of edge-emitting type. The laser diode 40 has a light-emission center 4000 from which laser light for thermal assist is emitted and a rear light-emission center 4001 positioned on the opposite side to the light-emission center 4000. The laser diode 40 is provided in the source-installation surface 2302 of the unit substrate 230 in such a way that the light-emission center 4000 is opposed to the light-receiving surface 430 of a spot-size converter 43.

While a photodiode section 55 is a semiconductor photodiode structure formed of a portion of the unit substrate 230 and is included in the unit substrate 230. The photodiode section 55 is located on the rear side (on +X side) of the laser diode 40 when viewed from the side of the joining surface 2300 of the unit substrate 230. The photodiode section 55 includes a light-receiving portion 550 that is located on the source-installation surface 2302 side of the unit substrate 230 and faces the source-installation surface 2302 in the present embodiment. The light-receiving portion 550 is provided in a position in which laser light emitted from the rear light-emission center 4001 of the laser diode 40 can be received. A p-electrode 551 is electrically connected to a p-type semiconductor portion of the photodiode section 55. The laser diode 40 is bonded to the unit substrate 230 with a p-electrode layer 40i (FIG. 2) closer to the rear light-emission center 4001 down (so that the p-electrode layer 40i faces the source-installation surface 2302) as will be detailed later. Accordingly, the rear light-emission center 4001 is located closer to the light-receiving portion 550 (source-installation surface 2302) compared with the case where the laser diode 40 was bonded in the reverse orientation.

With the configuration described above, the photodiode section 55 can receive, at its light-receiving portion 550, laser light (monitor light) emitted from the rear light-emission center 4001. By using the photodiode section 55 to detect the monitor light output, an output of laser light for thermal assist emitted from the light-emission center 4000 of the laser diode 40 can be monitored in real time. Since the rear light-emission center 4001 of the laser diode 40 and the light-receiving portion 550 of the photodiode section 55 can be located sufficiently close to each other, the light output from the laser diode 40 can be monitored with a higher efficiency.

The photodiode section 55 detects a rear output of laser light from the rear light-emission center 4001 opposite to the light-emission center 4000, rather than a front output of laser light from the light-emission center 4000 that is to be adjusted. However, the intensity of the rear output of laser diode 40 of edge-emitting type is typically proportional to the intensity of the front output of the laser diode 40. The intensity ratio of the rear output is set to a predetermined value in the range between 2 and 25%, for example, depending on the design of the internal configuration of the laser diode 40. Accordingly, by detecting the rear output from the rear light-emission center 4001, the front output from the light-emission center 4000 can be monitored.

The monitoring with the photodiode section 55 enables feedback adjustment of the front output of the laser diode 40 as a thermal assist light source, as will be detailed later with reference to FIG. 9. That is, the monitor output from the photodiode section 55 can be used to perform feedback adjustment of laser light output for thermal assist emitted from the laser diode 40. In addition, since the light output of the laser diode 40 can be adjusted in response to changes in the light output due to environmental influence or changes in the light output over time to stabilize the intensity of near-field light (NF-light) 62 for thermal assist (FIG. 3) applied to a magnetic disk 10 (FIG. 6), a region on the magnetic disk 10 where data is to be written can be properly and stably heated.

Referring also to FIG. 1, a first lead electrode 412 electrically connected to the p-electrode 551 connected to the p-type semiconductor portion of the photodiode section 55 and a second lead electrode 413 electrically connected to the n-type semiconductor portion of the photodiode section 55 are provided in the source-installation surface 2302 of the light source unit 23. The first lead electrode 412 is electrically insulated from the unit substrate 230 by an insulation layer 56 made of an insulating material such as $SiO_2$ or $Al_2O_3$, provided on the source-installation surface 2302. On the other hand, a portion of the second lead electrode 413 passes through the insulation layer 56 and is electrically connected to the n-type semiconductor portion inside the unit substrate 230. A light-source lead electrode 410 to be electrically connected to the p-electrode layer 40*i* (FIG. 2) of the laser diode 40 is also provided on the insulation layer 56 provided on the source-installation surface 2302 of the light source unit 23. Here, the light-source lead electrode 410 includes a light-source electrode part 4100 and a lead part 4101. The laser diode 40 is bonded onto the light-source electrode part 4100 by soldering or otherwise. A light-source terminal electrode 411 is provided on an n-electrode layer 40*a* (FIG. 2), which forms the upper surface of the laser diode 40, and is electrically connected to the n-electrode layer 40*a*.

The first and second lead electrodes 412 and 413, the lead part 4101 (the light-source lead electrode 410), and the light-source terminal electrode 411 are electrically connected to connection pads of a wiring member provided on a flexure 201 (FIG. 7) of a head gimbal assembly (HGA) by a method such as wire bonding or solder ball bonding (SBB). Design of these electrodes will be detailed later with reference to FIG. 5. Of course, other designs of electrodes on the source-installation surface 2302 are also possible.

Referring also to FIG. 1, the unit substrate 230 is preferably made of a semiconductor material such as Si or GaAs so that a portion of the unit substrate 230 can be processed and formed into the semiconductor photodiode structure to provide the photodiode section 55 inside the unit substrate 230. If the unit substrate 230 is made of such a semiconductor material, the solder layer 58 can be melted by irradiation with light such as Nd-YAG laser light while joining the light source unit 23 and the slider 22 with the solder layer 58, as will be detailed later.

As also shown in FIG. 1, the unit substrate 230 is somewhat smaller than the slider substrate 220. However, the width W of the unit substrate 230 in the track width direction (Y-axis direction) is larger than the width $W_{LA}$ of the laser diode 40 in the track width direction (Y-axis direction), so that the first and second lead electrodes 412 and 413, and the lead part 4101 are exposed in the source-installation surface 2302 even after the laser diode 40 is mounted on the light-source electrode part 4100. Further, the thickness $T_{UN}$ (in X-axis direction) of the unit substrate 230 is sufficiently larger than the length $L_{LA}$ (in X-axis direction) of the laser diode 40. In the case of using a Femto slider as the slider substrate 220, for example, the unit substrate 230 may have a thickness $T_{UN}$ (in X-axis direction) of 450 µm, a width $W_{UN}$ in the track width direction of 500 µm, and a length $L_{UN}$ (in Z-axis direction) of 300 µm.

(Slider)

In the slider 22 as also shown in FIG. 1, the head element part 221 formed on the element-integration surface 2202 includes: a head element 32 constituted of a magnetoresistive (MR) element 33 for reading data from the magnetic disk 10 (FIG. 6) and an electromagnetic transducer 34 for writing data to the magnetic disk 10; a spot-size converter 43 that receives a laser light emitted from the laser diode 40, changes (reduces) the spot size of the laser light, then guides the laser light into the waveguide 35; a waveguide 35 that guides the laser light with changed spot size to the head end surface 2210 as an opposed-to-medium surface or its vicinity; a surface plasmon generator 36 that generates NF-light for thermal assist by coupling with the laser light propagating the waveguide 35; and an overcoat layer 38 formed on the element-integration surface 2202 so as to cover the head element 32, the spot-size converter 43, the waveguide 35 and the surface plasmon generator 36. Here, the spot-size converter 43, the waveguide 35 and the surface plasmon generator 36 constitute the optical system 31 for generating NF-light in the head 21 (head element part 221). The spot-size converter 43 and waveguide 35 are covered with the overcoat layer 38, and functions as a core in light propagation, whereas the portion of overcoat layer 38 that covers them functions as a clad.

One ends of the MR element 33, the electromagnetic transducer 34 and the surface plasmon generator 36 reach the.

head end surface 2210 as an opposed-to-medium surface. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk 10 with a predetermined flying height. Thus, the ends of the MR element 33 and electromagnetic transducer 34 face the surface of the magnetic record layer of the magnetic disk 10 with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the spot-size converter 43 and the waveguide 35, is changed into NF-light 62 (FIG. 3) in the surface plasmon generator 36. Then, a portion to be written of the magnetic recording layer is irradiated and thus heated with the NF-light 62. As a result, the anisotropic magnetic field (coercive force) of the portion is decreased to a value that enables writing; thus the thermally-assisted magnetic recording can be achieved by applying write field with use of the electromagnetic transducer 34 to the anisotropic-field-decreased portion.

Referring also to FIG. 1, the spot-size converter 43 is an optical element which receives laser light emitted from the laser diode 40 at its light-receiving end surface 430 having a width $W_{SC}$ in the track width direction (Y-axis direction), converts the laser light to laser light with a smaller spot diameter with a low loss while maintaining a single mode, and then guides the converted laser light to a light-receiving end surface 352 of the waveguide 35. Here, the single-mode is a mode in which the laser light propagating within the spot-size converter 43 has a beam cross-section with a shape of circle or ellipsoid, and the light intensity distribution in the cross-section is single-peaked, especially a Gaussian. Laser light with a single mode can become a stable laser light with an intended intensity even in the case that the spot size of the laser light is converted into a smaller one due to the propagation through the spot-size converter 43. The spot-size converter 43 in the present embodiment includes a lower propagation layer 431 and an upper propagation layer 432. The lower propagation layer 431 has a width in the track width direction (Y-axis direction) that gradually decreases from the width $W_{SC}$ along the traveling direction (−X direction) of laser light incident through the light-receiving end surface 430. The upper propagation layer 432 is stacked on the lower propagation layer 431 and has a width in the track width direction (Y-axis direction) that more steeply decreases from the width $W_{SC}$ along the traveling direction (−X direction) of laser light than the lower propagation layer 431. Laser light incident through the light-receiving end surface 430 is converted to laser light with a smaller spot size as the laser light propagates through the layered structure, and reaches the light-receiving end surface 352 of the waveguide 35.

The width $W_{SC}$ of the spot-size converter 43 at the light-receiving end surface 430 may be in the range of approximately 1 to 10 µm, for example. The thickness $T_{SC}$ (in Z-axis direction) at the light-receiving end surface 430 may be in the range of approximately 1 to 10 μm, for example. The light-receiving end surface 430 is preferably inclined at a predetermined acute angle, for example at an angle of approximately 4° (degrees) with respect to the end surface 400 including the light-emission center 4000 of the laser diode 40. Such angle prevents laser light reflected by the light-receiving end surface 430 from returning to the light-emission center 4000. The spot-size converter 43 is made of a material with a refractive index higher than the refractive index $n_{OC}$ of the constituent material of the surrounding overcoat layer 38. The spot-size converter 43 can be formed from the same dielectric material as the waveguide 35, which will be described below. In the case, the spot-size converter 43 and the waveguide 35 may be formed integrally.

The waveguide 35 in the present embodiment extends in parallel with the element-integration surface 2202 from the light-receiving end surface 352 that receives laser light emitted from the spot-size converter 43 to the end surface 350 on the head end surface 2210 side. Here, the end surface 350 may be a portion of the head end surface 2210, or may be recessed from the head end surface 2210 with a predetermined distance. A portion of one side surface of the waveguide 35 near the end surface 350 faces a surface plasmon generator 36. This allows laser light (waveguide light) incident through the light-receiving end surface 352 and traveling through the waveguide 35 to reach the portion facing the surface plasmon generator 36, thereby to be coupled with the generator 36 in a surface plasmon mode.

Further, as also shown in FIG. 1, on the upper surface of the overcoat layer 38 of the slider 22, a pair of terminal electrodes 370 and a pair of terminal electrodes 371 are provided for the magnetic head element 32. The terminal electrodes 370 and 371 are also electrically connected to connection pads of the wiring member provided on the flexure 201 (FIG. 7) of the HGA by wire bonding, SBB, or the like.

The slider substrate 220 may be, for example, a so-called Femto slider having a thickness (in X-axis direction) $T_{SL}$ of 230 μm, a width $W_{SL}$ of 700 μm in the track width direction (Y-axis direction), and a length $L_{SL}$ (in Z-axis direction) of 850 μm. The Femto slider is commonly used as the substrate of a thin-film magnetic head capable of achieving a high recording density and is the smallest in standardized size among the currently used sliders. The slider substrate 220 can be formed of a ceramic material such as AlTiC ($Al_2O_3$-TiC) or $SiO_2$.

(Thermally-Assisted Magnetic Recording Head)

As described above, the thermally-assisted magnetic recording head 21 has the structure in which the slider 22 and the light source unit 23 are joined. Thus, the slider 22 and the light source unit 23 can be separately fabricated and then combined together to fabricate the head 21. Consequently, the production yield of the entire heads is about the same as the production yield of the sliders 22 if performance evaluation of the light source units 23 is performed prior to the fabrication of the heads and only good light source units 23 are used for the fabrication of the heads. Thus, significantly adverse influence to the production yield of heads 21 in the head manufacturing process due to the rejection rate of light-source units 23 can be avoided. Here, the positional relation between the laser diode 40 and the photodiode section 55 as well as each of the operation characteristics of laser diode 40 and photodiode section 55 influences the performance of the light source units 23. Thus, by checking the items that has a possibility to significantly affect the production yield in the upstream of manufacturing process and selecting light source units 23, degradation in production yield of heads 21 can be avoided. Here, the photodiode section 55 is manufactured within the unit substrate 230; there is no need to mount photodiode chips on the unit substrate 230 individually. Therefore, mechanical stress can be avoided in forming the photodiode section 55.

Furthermore, since the light source unit 23 is attached to the back surface 2201 of the slider 22 which is opposite to the ABS 2200 of the slider 22, the laser diode 40 can be always disposed in a location far from the ABS 2200. As a result, direct mechanical impact on the laser diode 40 and photodiode section 55 in operation can be avoided. Moreover, since the ABS 2200 of the slider 22 is perpendicular to the element-integration surface 2202, the slider 22 has a high affinity for conventional thin-film magnetic head fabrication process. Further, since an optical part that requires a considerably high accuracy such as an optical pickup lens or an optical part that requires a special structure for connection such as an optical fiber do not need to be provided in the thermally-assisted magnetic recording head 21, the number of man-hours and thus costs can be reduced.

Furthermore, since the monitoring system is contained inside the unit substrate 230 in the light source unit 23, the light source unit 23 has a less irregular general outline than a structure in which a photodiode chip is mounted on a unit substrate 230. This can avoid increase of air resistance of the thermally-assisted magnetic recording head 21 which would significantly disturb an air current around the head 21 while the head 21 is flying above the magnetic disk 10.

Figure 2:
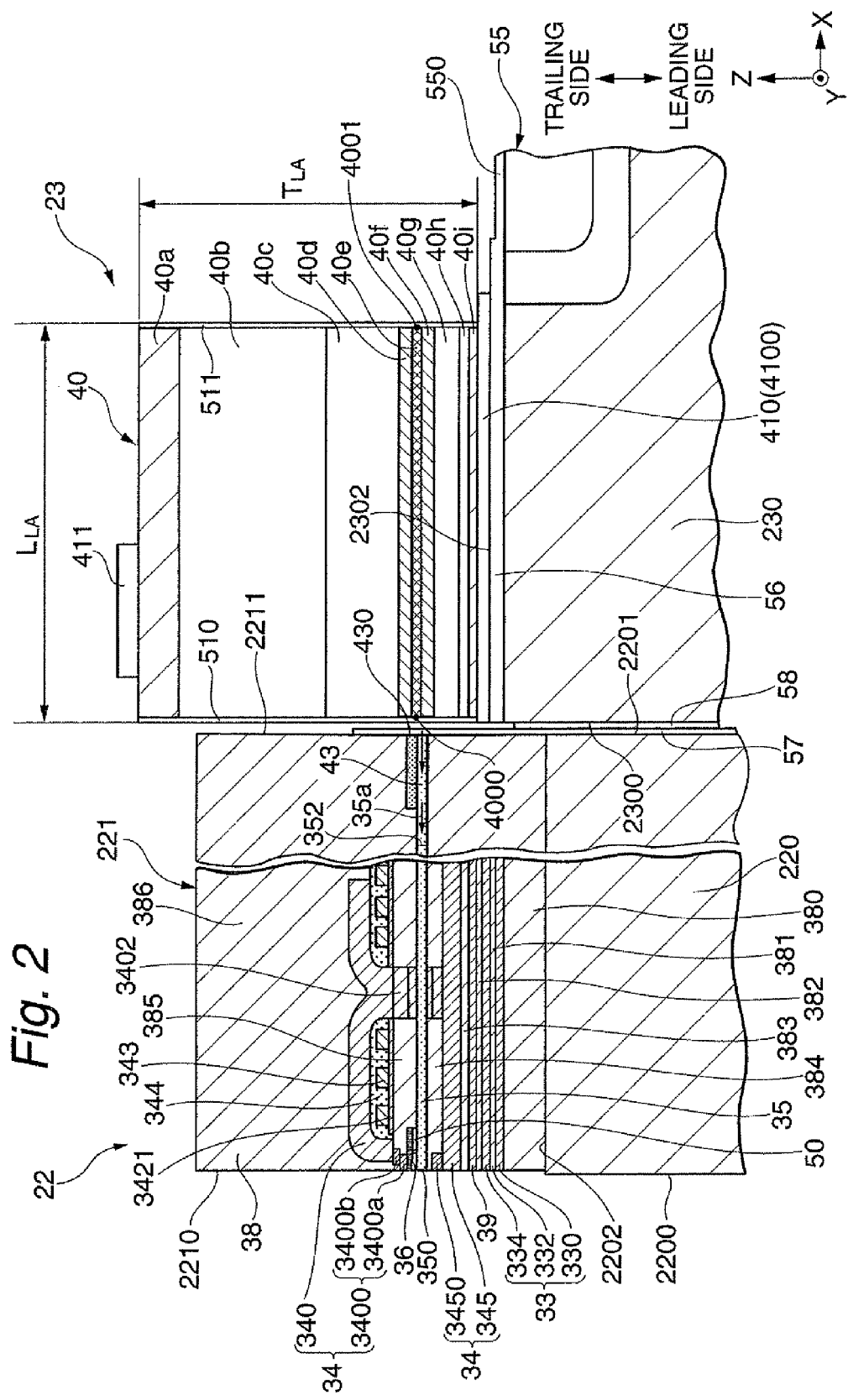
FIG. 2 shows a cross-sectional view taken by plane A in FIG. 1, schematically illustrating the structures of the head element part of the slider, the laser diode of the light source unit, and their vicinities in the thermally-assisted magnetic recording head according to the present invention.

FIG. 2 shows a cross-sectional view taken by plane A in FIG. 1, schematically illustrating the structures of the head element part 221 of the slider 22, the laser diode 40 of the light source unit 23, and their vicinities in the thermally-assisted magnetic recording head 21.

(Laser Diode)

According to FIG. 2, the laser diode 40 is of edge-emitting type. As the laser diode 40, InP base, GaAs base or GaN base diodes can be utilized, which are usually used for communication, optical disk storage, or material analysis. The wavelength $\lambda_L$ of the emitted laser light may be, for example, in the range of approximately 375 nm to 1.7 μm. The laser diode 40 shown in FIG. 2 has a multilayered structure in which sequentially stacked from the light-source terminal electrode 411 side as an upper surface side is: an n-electrode layer 40a; an n-GaAs substrate 40b; an n-InGaAlP clad layer 40c; the first InGaAlP guide layer 40d; an active layer 40e formed of multiquantum well (InGaP/InGaAlP) or the like; the second InGaAlP guide layer 40f; an p-InGaAlP clad layer 40g; a p-electrode base layer 40h; and a p-electrode layer 40i. Further, on the front and rear cleaved surfaces of the multilayered structure of the laser diode 40, respectively formed are reflective layers 510 and 511 for exciting the oscillation by total reflection. Here, the light-emission center 4000 exists at the position of the active layer 40e on the reflective layer 510, and the rear light-emission center 4001 exists at the position of the active layer 40e on the reflective layer 511.

Of course, the structure of the laser diode 40 is not limited to the above-described one. However, the laser diode 40 is preferably disposed in such a manner that the p-electrode layer 40i is positioned at the bottom and is bonded to the light-source electrode part 4100 of the light-source lead electrode 410. In edge-emitting laser diodes in general, the active layer 40e (light-emission center 4000, rear light-emission center 4001) is closer to the p-electrode layer 40i than the n-electrode layer 40a in the direction in which the layers are stacked (Z-axis direction). Accordingly, by positioning the p-electrode layer 40i at the bottom, the distance (in Z-axis direction) between the rear light-emission center 4001 and the source-installation surface 2302 can be set to a smaller value. Consequently, the position of the light-receiving portion 550 of the photodiode section 55 can be easily designed in such a manner that laser light (monitor light) emitted with its emitting center in the rear light-emission center 4001 can be sufficiently incident on the light-receiving portion 550 which is almost in plane with the light-source installation surface 2302.

As a result, by detecting the monitor light output with the photodiode section 55 having the light-receiving portion 550, the output of laser light for thermal assist emitted from the light-emission center 4000 of the laser diode 40 can be monitored in real time. Further, since the rear light-emission center 4001 and the light-receiving portion 550 are made sufficiently close to each other, the output from the rear light-emission center 4001 of the laser diode 40 can be monitored with a high efficiency. In addition, by setting the laser diode 40 with its p-electrode layer 40i as a bottom, the p-electrode layer 40i being closer to the active layer 40e that generates most amount of heat during operation, the unit substrate 230 can more effectively function as a heatsink of the light source.

According also to FIG. 2, by applying a predetermined voltage between the p-electrode layer 40i and the n-electrode layer 40a of the laser diode 40 through the light-source lead electrode 410 and light-source terminal electrode 411, the laser diode 40 oscillates and emits laser light from its light-emission center 4000 and rear light-emission center 4001. An electric source provided within the magnetic disk apparatus can be used for driving the laser diode 40. In fact, the magnetic disk drive apparatus usually has an electric source with applying voltage of, for example, approximately 2 to 5V, which is sufficient for the laser oscillation. Even in the case that the amount of electric power consumption of the laser diode 40 is, for example, in the vicinity of one hundred mW, the amount can be covered sufficiently by the electric source provided within the magnetic disk apparatus. The laser diode 40 may have a width $W_{LA}$ (FIG. 1) of, for example, approximately 150 to 250 μm. The length $L_{LA}$ of the laser diode 40 corresponds approximately to a cavity length that is the distance between the reflective layers 510 and 511, and is, for example, 300 μm. The length $L_{LA}$ is preferably 300 μm or more in order to obtain a sufficient high output. Further, the height $T_{LA}$ of the laser diode 40 is, for example, approximately 60 to 200 μm.

Referring also to FIG. 2, the p-electrode layer 40i of the laser diode 40 and the light-source electrode part 4100 (light-source lead electrode 410) of the unit substrate 230 can be bonded to each other by soldering using one of lead-free solders such as Au—Sn alloy. Further, the slider 22 and the light source unit 23 are bonded to each other in such a way that the back surface 2201 of the slider substrate 220 and the joining surface 2300 of the unit substrate 230 are opposed to each other and sandwich a solder layer 58 as an adhesion layer therebetween. Here, if the unit substrate 230 is made of a semiconductor material such as Si or GaAs, the solder layer 58 can be melted by irradiation with light such as Nd-YAG laser light while joining the light source unit 23 and the slider 22 with the solder layer 58.

Actually, Nd-YAG laser light has a wavelength of 1064 nm (nanometers), and passes through the unit substrate 230 with a transmittance of 50% or more, the unit substrate 230 being made of a semiconductor material such as Si (transmittance: 67%), or GaAs (transmittance: 66%). This ensures the bonding between the light source unit 23 and the slider 22 by irradiating and melting the solder layer 58 with Nd-YAG laser light through the light source unit 23, the light source unit 23 and slider 22 sandwiching the solder layer 58 therebetween.

The solder layer 58 is preferably formed of a material melted and solidified with the laser light that has passed through the unit substrate 230. The solder layer 58 is preferably made of an alloy containing one element selected from the group consisting of Au (gold), Ag (silver), Cu (copper), Ge (germanium), Al (aluminum) and Mg (magnesium) that has a melting point of lower than 400° C. The thickness of the solder layer 58 may be in the range of approximately 0.05 to 5.0 μm (micrometers), for example.

(Insulating Means Between Light Source Unit and Slider)

As illustrated also in FIG. 2, preferably an insulating film 57 for electrically insulating the unit substrate 230 from the slider substrate 220 is provided on the back surface 2201 of the slider substrate 220 and the end surface 2211 of the head element part 221. The insulating film 57 ensures electrical insulation between the unit substrate 230 and the slider substrate 220. Here, the slider substrate 220 is usually grounded. The unit substrate 230, on the other hand, is at the same potential as the n-type semiconductor portion of the photodiode section 55, of course. The n-type semiconductor portion (or the second lead electrode 413 electrically connected to the n-type semiconductor portion) usually cannot be used in such a way as to be grounded. Therefore, the insulation between the slider substrate 220 and the unit substrate 230 is essential.

The insulating film 57 may cover the light-receiving end surface 430 of the optical system 31 (spot-size converter 43) in the head element part 221, and preferably also functions as an antireflection means for laser light incident in the optical system 31 from the laser diode 40. This avoids an oscillation fault of the laser diode 40 due to light returned from the light-receiving end surface 430. The insulating film 57 may be a multilayer formed by alternately stacking two types of dielectric films having different refractive indices, such as $TaO_x$ and $SiO_x$, for example, while the thickness of each film is being controlled on the basis of the wavelength of laser light.

(Head Element Part)

As shown also in FIG. 2, the head element part 221 includes an MR element 33 and an electromagnetic transducer 34 and an optical system 31.

The MR element 33 is formed on a base layer 380 that is formed of an insulating material such as $Al_2O_3$ (alumina), $SiO_2$ and stacked on the element-integration surface 2202. The MR element 33 includes: an MR multilayer 332; and a lower shield layer 330 and an upper shield layer 334 which are formed of a soft-magnetic material and sandwich the MR multilayer 332 and an insulating layer 381 therebetween. The MR multilayer 332 is a magneto-sensitive part for detecting signal magnetic field by utilizing MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. In the case that the MR multilayer 332 is a CPP-GMR multilayer or a TMR multilayer, the upper and lower shield layers 334 and 330 act as electrodes as well as magnetic shields.

The electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk 10 (FIG. 6), the magnetic flux being excited by write current flowing through the write coil layer 343. The main magnetic pole 3400 includes: a first main pole portion 3400a reaching the head end surface 2210 and having a small width $W_P$ (FIG. 3) in the track width direction; and a second main pole portion 3400b located on the first main pole portion 3400a and at the rear (+X side) of the portion 3400a. The first main pole portion 3400a has an end surface 3400e (FIG. 3) with a shape of, for example, a rectangle, a square or a trapezoid on the head end surface 2210. Here, the above-described width $W_p$ is the length of an edge in the track width direction (Y-axis direction) of the end surface 3400e, and defines the width of write field distribution in the track width direction (Y-axis direction). The width $W_P$ can be set to be, for example, 0.05 to 0.5 μm. The main magnetic pole 3400 is preferably formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the first main pole portion 3400a is, for example, in the range of approximately 0.1 to 0.8 μm.

The write coil layer 343 is formed on an insulating layer 385 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment; however, may have a two or more layered structure or a helical coil shape. Further, the number of turns of the write coil layer 343 is not limited to that shown in FIG. 2, and may be, for example, in the range from two to seven.

The back contact portion 3402 has a though-hole extending in X-axis direction, and the waveguide 35 and insulating layers that covers the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material, and its thickness is, for example, approximately 0.5 to 5 μm. Further, the lower shield 3450 is a part of the magnetic path, being connected with the lower yoke layer 345 and reaching the head end surface 2210. The lower shield 3450 is opposed to the main magnetic pole 3400 through the surface plasmon generator 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the first main pole portion 3400a to become steeper. As a result, jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

Referring also to FIG. 2, the optical system 31 includes a spot-size converter 43, a waveguide 35 and a surface plasmon generator 36.

Laser light 53a, the spot size of which the spot-size converter 43 changes (reduces), enters the waveguide 35 from the light-receiving end surface 352, and propagates through the waveguide 35. The waveguide 35 extends from the light-receiving end surface 352 to the end surface 350 on the head end surface 2210 side through the through-hole that is provided in the back contact portion 3402 and extends in X-axis direction. Furthermore, the surface plasmon generator 36 is a near-field light generator (NFL-generator) that transforms the laser light (waveguide light) propagating through the waveguide 35 into NF-light. A part on the head end surface 2210 side of the waveguide 35 and the surface plasmon generator 36 are provided between the lower shield 3450 (lower yoke layer 345) and the main magnetic pole 3400 (upper yoke layer 340). Further, a portion of the upper surface (side surface) of the waveguide 35 on the head end surface 2210 side is opposed to a portion of the lower surface (including a propagative edge 360 (FIG. 3)) of the surface plasmon antenna 36 with a predetermined distance. The sandwiched portion between these portions constitutes a buffering portion 50 having a refractive index lower than that of the waveguide 35. The buffering portion 50 acts for coupling the laser light (waveguide light) that propagates through the waveguide 35 with the surface plasmon generator 36 in a surface plasmon mode. A detailed explanation of the waveguide 35, the buffering portion 50 and the surface plasmon generator 36 will be given later with reference to FIG. 3.

Further, also as shown in FIG. 2, an inter-element shield layer 39 is preferably provided between the MR element 33 and the electromagnetic transducer 34 (lower yoke layer 345), sandwiched by the insulating layers 382 and 383. The inter-element shield layer 39 plays a role for shielding the MR element 33 from the magnetic field generated from the electromagnetic transducer 34, and may be formed of a soft-magnetic material. Here, the above-described insulating layers 381, 382, 383, 384, 385 and 386 constitute the overcoat layer 38.

Figure 3:
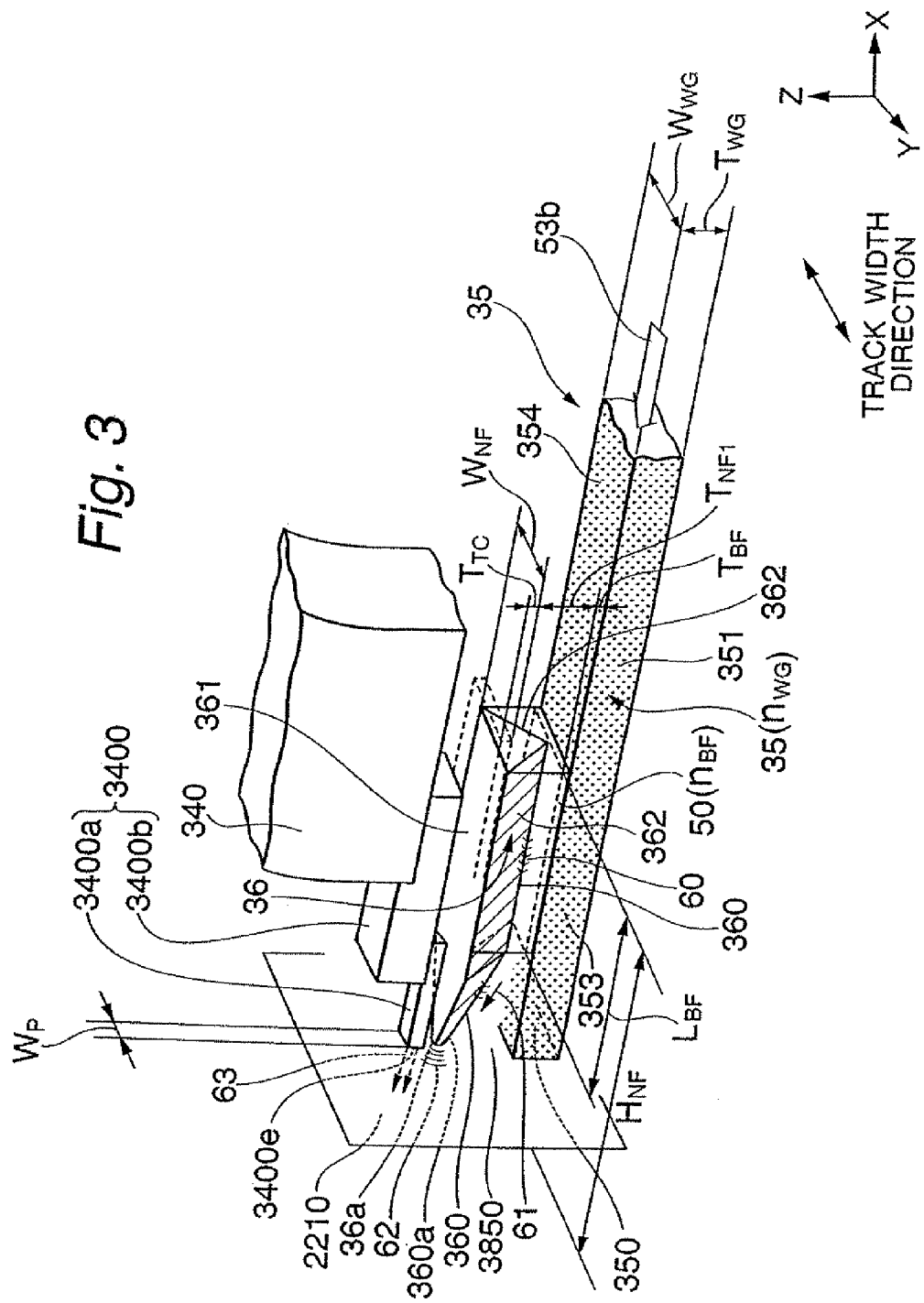
FIG. 3 shows a perspective view schematically illustrating the configuration of the waveguide, the surface plasmon generator and the main magnetic pole.

FIG. 3 shows a perspective view schematically illustrating the configuration of the waveguide 35, the surface plasmon generator 36 and the main magnetic pole 3400. In the figure, the head end surface 2210 is positioned at the left side, the surface 2210 including positions where write field and NF-light are emitted toward the magnetic recording medium.

As shown in FIG. 3, the configuration includes the waveguide 35 for propagating laser light (waveguide light) 53b used for generating NF-light toward the end surface 350, and the surface plasmon generator 36 that has a propagative edge 360 as an edge on which surface plasmon excited by the laser light (waveguide light) 53b propagates. The surface plasmon generator 36 further includes a near-field light generating (NFL-generating) end surface 36a that reaches the head end surface 2210 and is a destination for the excited surface plasmon. The propagative edge 360 extents to the NFL-generating end surface 36a. Further, a buffering portion 50 is a portion sandwiched between a portion of the side surface 354 of the waveguide 35 and a portion of the lower surface 362 including the propagative edge 360 of the surface plasmon generator 36. That is, the propagative edge 360 is covered with the buffering portion 50. The buffering portion 50 acts for coupling the waveguide light 53b with the surface plasmon generator 36 in a surface plasmon mode. Further, the propagative edge 360 plays a role of propagating the surface plasmon excited by the waveguide light 53b to the NFL-generating end surface 36a. Here, side surfaces of the waveguide 35 are defined as, out of end surfaces surrounding the waveguide 35, end surfaces other than the end surface 350 on the head end surface 2210 side and the light-receiving end surface 352 on the opposite side. These side surfaces serve as surfaces on which the propagating waveguide light 53b can be totally reflected in the waveguide 35 that corresponds to a core. In the present embodiment, the side surface 354 of the waveguide 35, a portion of which is in surface contact with the buffering potion 50, is the upper surface of the waveguide 35. And, the buffering portion 50 may be a portion of the overcoat layer 38 (FIG. 2), or may be provided as a new layer other than the overcoat layer 38.

Specifically, the waveguide light 53b, which has advanced to near the buffering portion 50, is involved with the optical configuration including the waveguide 35 with a refractive index $n_{WG}$, the buffering portion 50 with a refractive index $n_{BF}$ and the surface plasmon generator 36 made of a metal, and induces a surface plasmon mode on the propagative edge 360 of the surface plasmon generator 36. That is, the waveguide light couples with the surface plasmon generator 36 in a surface plasmon mode. The induction of the surface plasmon mode becomes possible by setting the refractive index $n_{BF}$ of the buffering portion 50 to be smaller than the index $n_{WG}$ of the waveguide 35 ($n_{BF} < n_{WG}$). Actually, evanescent light is excited within the buffering portion 50 under an optical boundary condition between the waveguide 35 as a core and the buffering portion 50. Then, the evanescent light couples with the fluctuation of electric charge excited on the metal surface (propagative edge 360) of the surface plasmon generator 36, and induces the surface plasmon mode, thereby there is excited surface plasmon 60. Here, the propagative edge 360 is located closest to the waveguide 35 on the inclined lower surface 362 of the surface plasmon generator 36, and is just an edge where electric field tends to converge; thus surface plasmon can easily be excited on the edge 360. The propagative edge 360 is preferably made rounded to prevent surface plasmon 60 from running off from the edge 360, and thus to prevent the degradation of light use efficiency.

In the light source and optical system as shown in FIGS. 1 to 3, the laser light emitted from the light-emission surface 400 of the laser diode 40 preferably has TM-mode polarization in which the oscillation direction of electric field of the laser light is along Z-axis. Further, the waveguide light 53b accordingly have a linear polarization in which the oscillation direction of electric field of the laser light is Z-axis direction, that is, perpendicular to the layer surface of the waveguide 35. Setting the polarization enables the waveguide light 53b propagating through the waveguide 35 to be coupled with the surface plasmon generator 36 in a surface plasmon mode.

Further, as shown also in FIG. 3, the surface plasmon generator 36, in the present embodiment, tapers in the height direction (Z-axis direction) near the head end surface 2210 toward the NFL-generating end surface 36a. Further, the surface plasmon generator 36 has, in the present embodiment, a cross-section taken by YZ plane with a triangular shape, and the NFL-generating end surface 36a especially has an isosceles triangle shape in which one apex on the leading side (−Z side) is the end of the propagative edge 360. Thus, surface plasmon 60 propagating on the propagative edge 360 reaches the NFL-generating end surface 36a having an apex 360a as a destination of the edge 360. As a result, the surface plasmon 60, namely, electric field converges in the NFL-generating end surface 36a. Thereby NF-light 62 is emitted from the end surface 36a toward the magnetic recording layer of the magnetic disk 10 (FIG. 6), and reaches the surface of the magnetic disk 10 to heat a portion of the magnetic recording layer of the disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, the thermally-assisted magnetic recording can be accomplished.

Further, the side surfaces of the waveguide 35: the upper surface 354, the lower surface 353, and both the side surfaces 351 in the track width direction (Y-axis direction) have a surface contact with the overcoat layer 38, that is, the insulating layers 384 and 385, except a portion having a surface contact with the buffering portion 50. Here, the waveguide 35 is formed of a material with a refractive index $n_{WG}$ higher than the refractive index $n_{OC}$ of the constituent material of the overcoat layer 38, made by using, for example, a sputtering method. This material design causes the waveguide 35 to act as a core, and causes the overcoat layer 38 to act as a clad. For example, in the case that the wavelength $\lambda_L$ of the laser light is 600 nm and the overcoat layer 38 is formed of $Al_2O_3$ (n=1.63), the waveguide 35 can be formed of, for example, $SiO_xN_y$ (n=1.7-1.85) or $Ta_2O_5$ (n=2.16). Further, in the present embodiment, the waveguide 35 has a cross-section taken by YZ-plane of a rectangular or trapezoidal shape. The width $W_{WG}$ in the track width direction (Y-axis direction) of a portion of the waveguide 35 near the end surface 350 on the head end surface 2210 side may be, for example, in the range approximately from 0.3 to 0.7 μm. Further, the thickness $T_{WG}$ (in Z-axis direction) of the waveguide 35 may be, for example, in the range approximately from 0.3 to 0.7 μm.

The buffering portion 50 is formed of a dielectric material having a refractive index $n_{BF}$ lower than the refractive index $n_{WG}$ of the waveguide 35. For example, when the wavelength $\lambda_L$ of the laser light is 600 nm and the waveguide 35 is formed of $Ta_2O_5$ (n=2.16), the buffering portion 50 can be formed of $SiO_2$ (n=1.46) or $Al_2O_3$ (n=1.63). Further, the length $L_{BF}$ (in X-axis direction) of the buffering portion 50, namely, the length of a portion sandwiched between the side surface 354 of the waveguide 35 and the propagative edge 360, is preferably in the range of 0.5 to 5 μm, and is preferably larger than the wavelength $\lambda_L$ of the laser light 53b. Further, the thickness $T_{BP}$ (in Z-axis direction) of the buffering portion 50 is preferably in the range of 10 to 200 nm.

The surface plasmon generator 36 is preferably formed of a conductive material of, for example, a metal such as Ag, Au, pd, Pt, Rh, Ir, Ru, Cu or Al, or an alloy made of at least two of these elements, especially an alloy with Ag as a main component. Further, the surface plasmon generator 36 can have a width $W_{NF}$ in the track width direction (Y-axis direction) of the upper surface 361, the width $W_{NF}$ being sufficiently smaller than the wavelength of the laser light 53b, and being in the range of, for example, approximately 10 to 100 nm. And the surface plasmon generator 36 can have a thickness $T_{NF1}$ (in Z-axis direction) sufficiently smaller than the wavelength of the laser light 53b, the thickness $T_{NF1}$ being in the range of, for example, approximately 10 to 100 nm. Further, the length (height) $H_{NF}$ (in X-axis direction) can be set to be in the range of, for example, approximately 0.8 to 6.0 μm.

The optical system that is provided in the head element part 221 and generates light for thermal assist is not limited to the above-described one. For example, as an alternative, there can be available an optical system that use a NF-light generator having another shape and structure, or an optical system in which a plasmon antenna made of a metal piece is provided at the end of a waveguide.

Figure 4A:
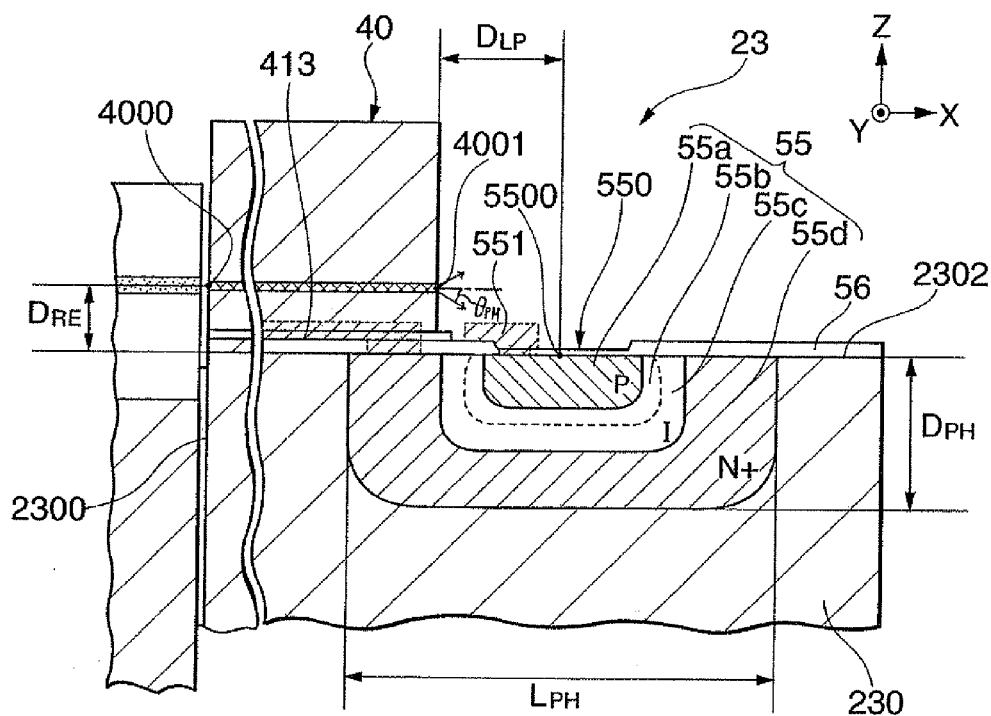
FIG. 4a shows a cross-sectional view taken by plane A in FIG. 1, schematically illustrating a configuration of the photodiode section and its surrounding in the light source unit of the thermally-assisted magnetic recording head according to the present invention.
Figure 4B:
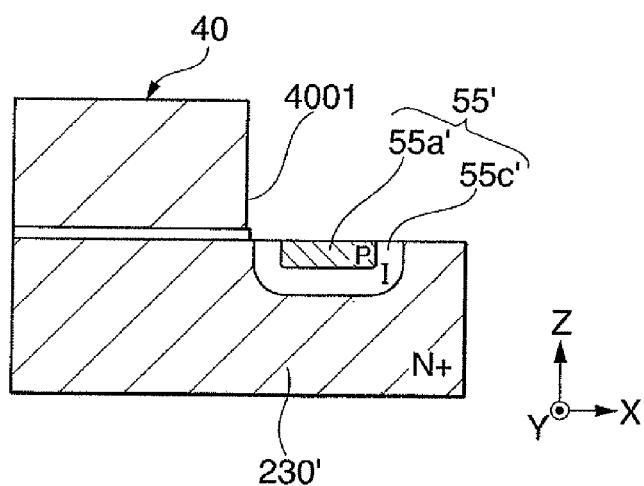
FIG. 4b shows a cross-sectional view schematically illustrating another embodiment of the photodiode section of the light source unit according to the present invention.

FIG. 4a shows a cross-sectional view taken by plane A in FIG. 1, schematically illustrating a configuration of the photodiode section 55 and its surrounding in the light source unit 23 of the thermally-assisted magnetic recording head 21. FIG. 4b shows a cross-sectional view schematically illustrating another embodiment of the photodiode section 55 of the light source unit 23.

As illustrated in FIG. 4a, the photodiode section 55 is a semiconductor photodiode structure formed from a portion of the unit substrate 230 and is contained inside the unit substrate 230. The photodiode section 55 is located on the rear side (on +X side) of the laser diode 40 when viewed from the joining surface 2300 side of the unit substrate 230.

The photodiode section 55 has a PIN-type photodiode structure in the present embodiment and includes a p-type semiconductor portion 55a, an n-type semiconductor portion 55d with highly-doped impurity, and an intrinsic portion 55c which is provided between the p-type semiconductor portion 55a and the n-type semiconductor portion 55d and has a very low impurity concentration. The p-type semiconductor portion 55a is located close to the source-installation surface 2302. The upper surface of the p-type semiconductor portion 55a is in plane with the source-installation surface 2302 and forms the light-receiving portion 550. The p-electrode 551 is electrically connected to the p-type semiconductor portion 55a. The end potion of the n-type semiconductor part 55d also reaches the source-installation surface 2302. The second lead electrode 413 is electrically connected to the n-type semiconductor portion 55d. In an alternative, the photodiode section 55 may have a PN-junction diode structure including a PN-junction of a p-type semiconductor portion and an n-type semiconductor portion.

However, the provision of the intrinsic portion 55c widens the width of a depletion layer in the PIN-type photodiode structure of the present embodiment and therefore parasitic capacitance can be minimized. Consequently, a higher sensitivity and a higher response speed can be achieved compared with the PN-junction diode structure. In FIG. 4a, when a reverse bias is applied to the photodiode section 55, that is, a positive voltage is applied to the second lead electrode 413 with the p-electrode 551 grounded, for example, a wide depletion layer 55b is generated due to the presence of the intrinsic portion 55c. Here, when laser light (monitor light) from the rear light-emission center 4001 of the laser diode 40 enters the photodiode section 55 where the depletion layer 55b is produced through the light-receiving portion 550, a photoelectric effect occurs and a quantity of electron-hole pairs that is dependent on the amount of the light is generated. The electrons of the pairs flow into the n-type semiconductor portion 55d and the holes flow into the p-type semiconductor portion 55a. As a result, photovoltaic power that is dependent on the amount of incident light is generated between electrodes 551 and 413. By measuring the photovoltaic power or by connecting a load between the electrodes 551 and 413 to measure a current flowing through the load, a monitor output from the photodiode section 55 can be obtained.

While the photodiode section 55 can be formed by embedding a photodiode chip in the unit substrate 230, the photodiode section 55 is preferably formed from a portion of the unit substrate 230 by using a conventional technique that utilizes photolithography, ion implantation and so on to form a photodiode structure on a silicon wafer. This forming method involves fewer elements to form and is low-cost compared with the method of embedding the chip, and the problem of mechanical stress during mounting can be circumvented. Here, the length $L_{PH}$ (in X-axis direction) of the photodiode section 55 may be in the range of, for example, approximately 50 to 150 μm, the depth $D_{PH}$ (in Z-axis direction) may in the range of, for example, approximately 5 to 50 μm, and the width $W_{PH}$ (in Y-axis direction) (FIG. 1) may be in the range of, for example, approximately 50 to 150 μm.

Alternatively, an n+-type Si or GaAs unit substrate 230' may be used, and an intrinsic portion 55c' and a p-type semiconductor portion 55a' may be formed in the unit substrate 230' as illustrated in FIG. 4b to form the entire unit substrate 230 into a photodiode section 55.

Returning to FIG. 4a, in order for the photodiode section 55 to efficiently and reliably detect monitor light emitted from the laser diode 40, the relative positional relationship between the rear light-emission center 4001 of the laser diode 40 and the light-receiving center 5500 of the light-receiving portion 550 is properly determined. Here, the divergence angle (emission angle) $\theta_{PH}$ of laser light emitted from the rear light-emission center 4001 is in the range of approximately 5 to 22° (degrees), for example. Preferably at least the light-receiving center 5500 falls within the circular cone of emitted laser light having such emission angle. In order to achieve such positional relationship, the distance $D_{RE}$ (in Z-axis direction) between the source-installation surface 2302 of the unit substrate 230 and the rear light-emission center 4001 may be set to 8 μm, for example, and the distance $D_{LP}$ (in X-axis direction) between the rear light-emission center 4001 and the light-receiving center 5500 may be set to 45 μm, for example.

Figure 5:
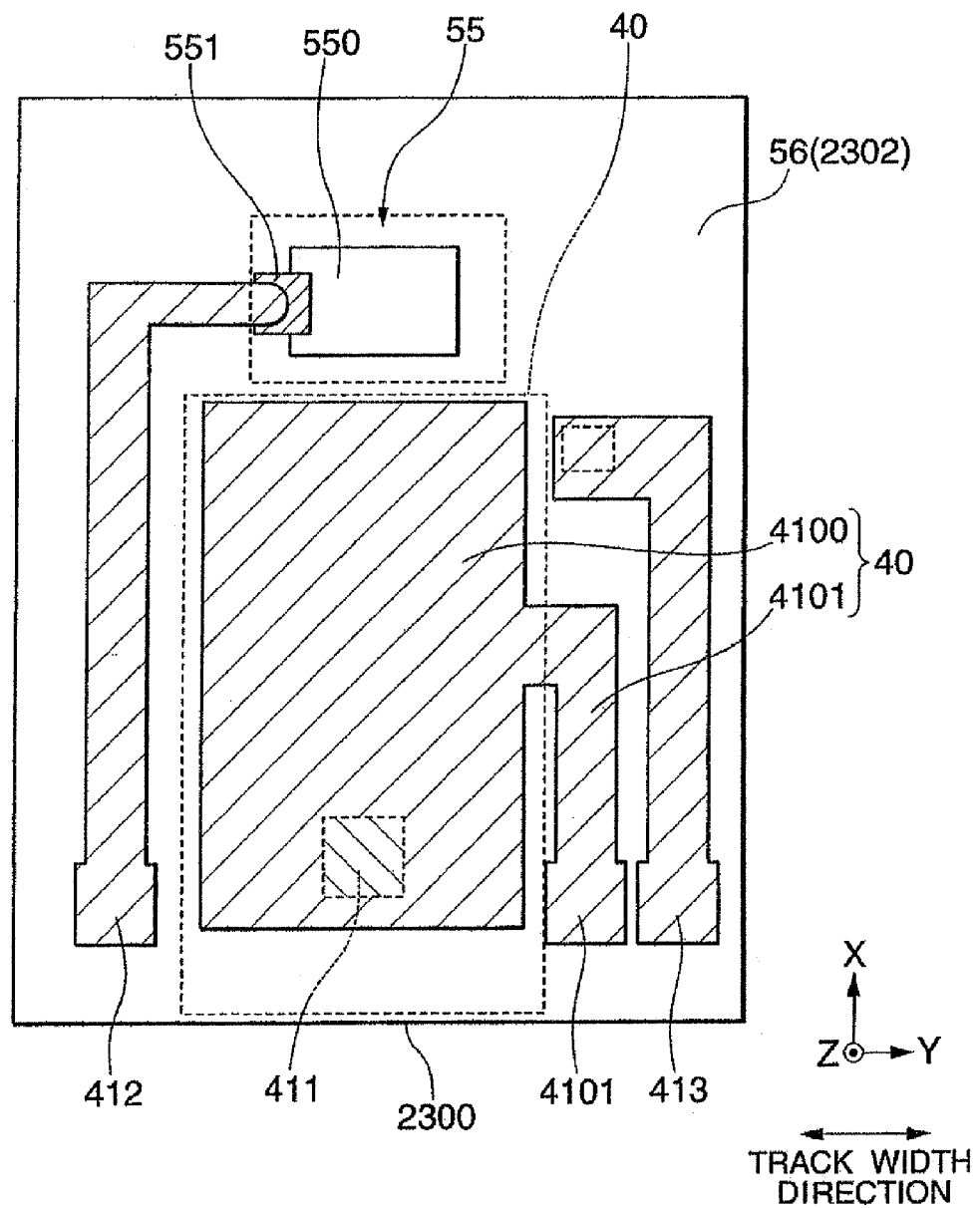
FIG. 5 shows a schematic view illustrating an embodiment of design of electrodes provided on the source-installation surface of the light source unit according to the present invention.

FIG. 5 shows a schematic view illustrating an embodiment of design of electrodes provided on the source-installation surface 2302 of the light source unit 23.

Referring to FIG. 5, an insulation layer 56 of an insulating material such as $SiO_2$ or $Al_2O_3$ is provided on the source-installation surface 2302. The first lead electrode 412 and the second lead electrode 413, which are two electrodes for the photodiode section 55, and the light-source lead electrode 410, which is one electrode for the laser diode 40, are provided on the insulation layer 56. The first lead electrode 412 is electrically connected to the p-electrode 551 of the photodiode section 55, and a portion of the second lead electrode 413 passes through the insulation layer 56 and is electrically connected to the n-type semiconductor portion 55d of the photodiode section 55. The light-source lead electrode 410 includes a light-source electrode part 4100 and a lead part 4101. The light-source terminal electrode 411, which is another electrode for the laser diode 40, is provided on (the n-electrode layer 40a of) the laser diode 40.

The first and second lead electrodes 412 and 413 and the light-source lead electrode 410 can be constituted by a foundation layer made of a material such as Ta or Ti with a thickness of approximately 10 nm, for example, and a conductive layer made of a conductive material such as Au, Cu, Al or an alloy containing at least one of these elements with a thickness in the range of approximately 1 to 5 μm, for example. Alternatively, the lead electrodes can be formed by depositing a solder material, for example Au—Sn alloy, on the insulation layer 56 formed on the source-installation surface 2302 by a method such as evaporation. The light-source terminal electrode 411 may be a conductive layer made of a material such as Au, Cu, Al or an alloy containing at least one of these elements, formed on the n-electrode layer 40a (FIG. 2) of the laser diode 40 with a thickness in the range of approximately 1 to 5 μm, for example.

The first and second lead electrodes 412 and 413, the lead part 4101, and the light-source terminal electrode 411 extend to near the joining surface 2300 or are located near the joining surface 2300. This pattern facilitate electrical connection between these electrodes and the connection pads of the wiring member of the flexure 201 when the head 21 is joined to the flexure 201 to form an HGA, as will be described later with reference to FIG. 8.

Figure 6:
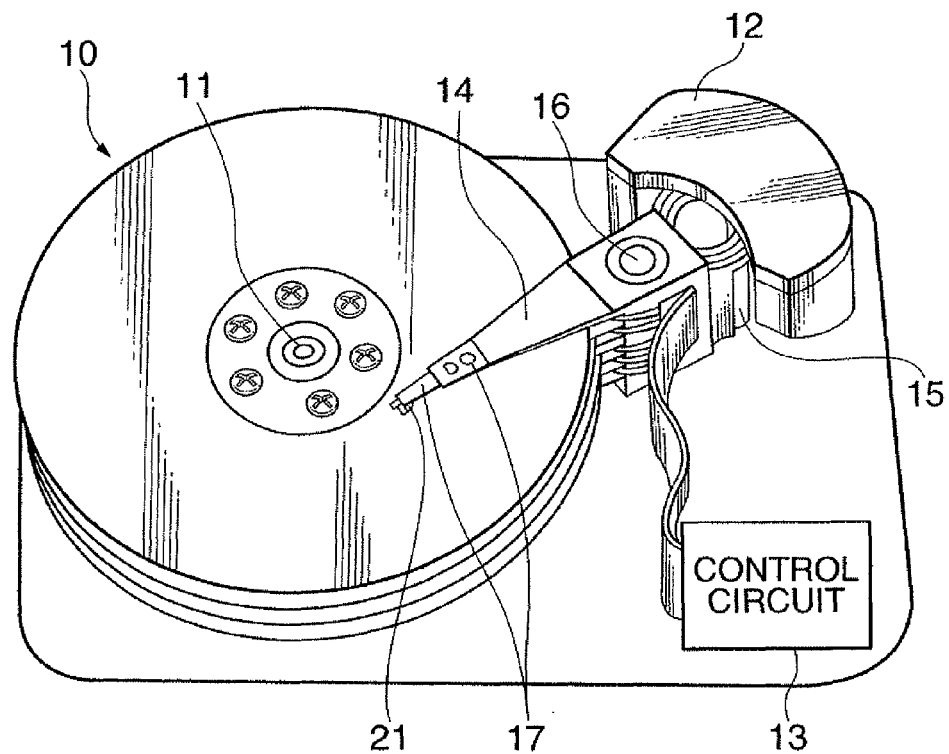
FIG. 6 shows a perspective view schematically illustrating a structure of a major part in one embodiment of a magnetic disk apparatus according to the present invention.

FIG. 6 shows a perspective view schematically illustrating a structure of a major part in one embodiment of a magnetic disk apparatus according to the present invention.

A magnetic disk apparatus as a magnetic recording apparatus shown in FIG. 6 includes: a plurality of magnetic disks 10 rotating around a rotational axis of a spindle motor 11; an assembly carriage device 12 provided with a plurality of drive arms 14 thereon; an HGA 17 attached on the top end portion of each drive arm 14 and provided with a thermally-assisted magnetic recording head 21; and a recording/reproducing and light-emission control circuit 13 for controlling write/read operations of the thermally-assisted magnetic recording head 21 and further for controlling the emission operation of the laser diode 40 based on monitoring output generated from the photodiode section 55 included in the head 21.

The magnetic disk 10 is, in the present embodiment, designed for perpendicular magnetic recording, and has a structure in which, for example, sequentially stacked on a disk substrate is: a soft-magnetic under layer; an intermediate layer; and a magnetic recording layer (perpendicular magnetization layer). The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and sliders 21 may be one.

Figure 7:
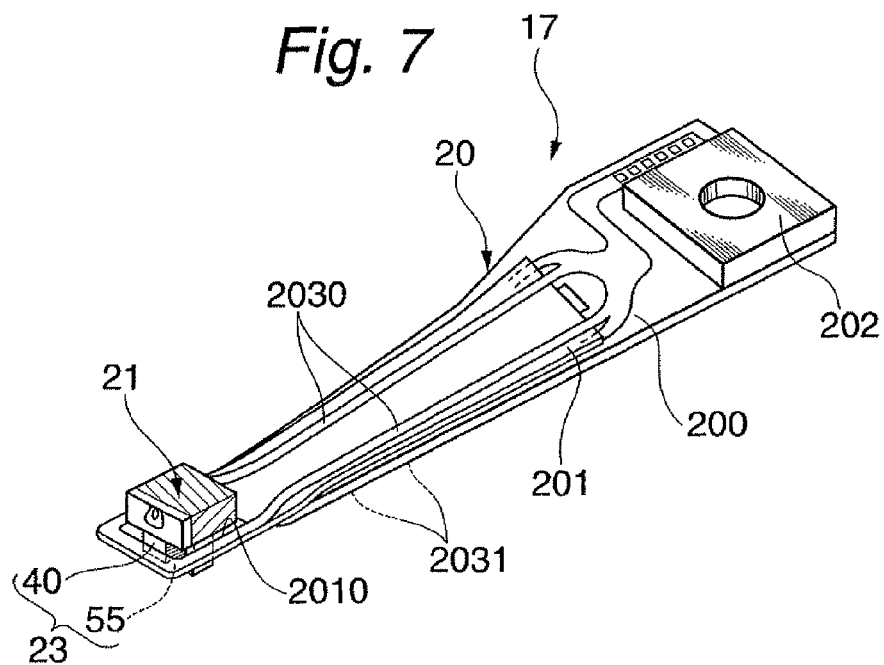
FIG. 7 shows a perspective view schematically illustrating a structure of a major part in one embodiment of the head gimbal assembly (HGA) according to the present invention.

FIG. 7 shows a perspective view schematically illustrating a structure of a major part in one embodiment of the HGA 17 according to the present invention. In FIG. 2, the side of the HGA 17 opposed to the surface of the magnetic disk 10 is presented as the upper side.

Referring to FIG. 7, a suspension 20 in the HGA 17 includes a load beam 200, a flexure 201 with elasticity fixed to the load beam 200, a base plate 202 provided on the base portion of the load beam 200, and a wiring member 2030 provided on a surface of the flexure 201 opposed to the magnetic disk 10, and a wiring member 2031 provided on a surface of the flexure 201 on the side opposite to the magnetic disk 10. Each of the wiring members 2030 and 2031 includes lead conductors and connection pads electrically joined to both ends of the lead conductors. The thermally-assisted magnetic recording head 21 is fixed to the flexure 201 at the top end portion of the suspension 20 so as to face the surface of each magnetic disk 10 with a predetermined space (flying height).

In the flexure 201, there is provided an aperture 2010; the thermally-assisted magnetic recording head 21 is fixed in such a way that a light source unit 23 as a part of the head 21 protrudes through the aperture 2010 on the opposite side of the flexure 201. Further, one end (connection pads) of the wiring member 2030 is electrically connected to terminal electrodes 370 and 371 of the slider 22 by using wire bonding, SBB or the like. One end (connection pads) of the wiring member 2031 is electrically connected to the first and second lead electrodes 412 and 413, the lead part 4101 (light-source lead electrode 410), and the light-source terminal electrode 411 of the light source unit 23 by using wire bonding, SBB or the like. These electrical connections will be explained hereinafter with reference to FIG. 8. The structure of the suspension 20 is not limited to the above-described one. An IC chip for driving the head may be mounted midway on the suspension 20, though not shown.

Figure 8:
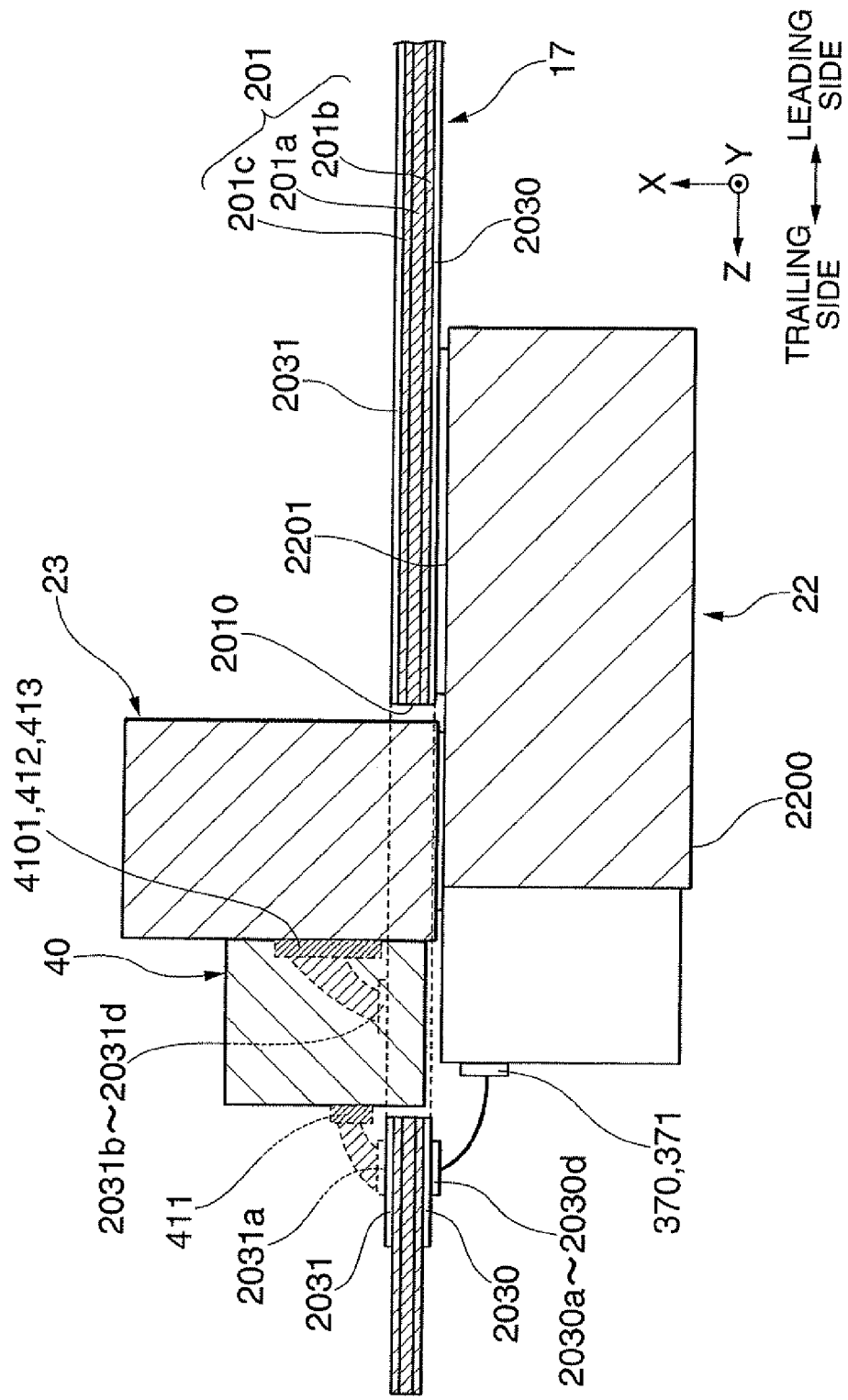
FIG. 8 shows a perspective view schematically illustrating connection between the flexure and the thermally-assisted magnetic recording head in one embodiment of the HGA according to the present invention.

FIG. 8 shows a perspective view schematically illustrating connection between the flexure 201 and the thermally-assisted magnetic recording head 21 in one embodiment of the HGA 17 according to the present invention. In FIG. 8, an ABS 2200 of the head 21, which faces the surface of a magnetic disk 10, is depicted at the bottom.

Referring to FIG. 8, the back surface 2201 of the thermally-assisted magnetic recording head 21 and the flexure 201 are joined together in such a manner that the light source unit 23 protrudes on the other side of the flexure 201 through an opening 2010. The flexure 201 is formed of a substrate 201a made of a material such as stainless steel and coating layers 201b and 201c which are made of a material such as a polyimide and coat the substrate 201a. A wiring member 2030 made of a conductive material such as Cu is provided on the coating layer 201b. Similarly, a wiring member 2031 made of a conductive material such as Cu is provided on the coating layer 201c.

Connection pads 2030a to 2030d of the wiring member 2030 are electrically connected to terminal electrodes 370 and 371 for the MR element 33 and the electromagnetic transducer 34 by a method such as wire bonding or SBB. This enables the MR element 33 and the electromagnetic transducer 34 to operate through the wiring member 2030. Connection pads 2031a to 2031d of the wiring member 2031 are electrically connected to the lead part 4101 and the light-source terminal electrode 411 for the laser diode 40 and to the first and second lead electrodes 412 and 413 for the photodiode section 55 by a method such as wire bonding or SBB. This enables the laser diode 40 and the photodiode section 55 to operate through the wiring member 2031.

Figure 9:
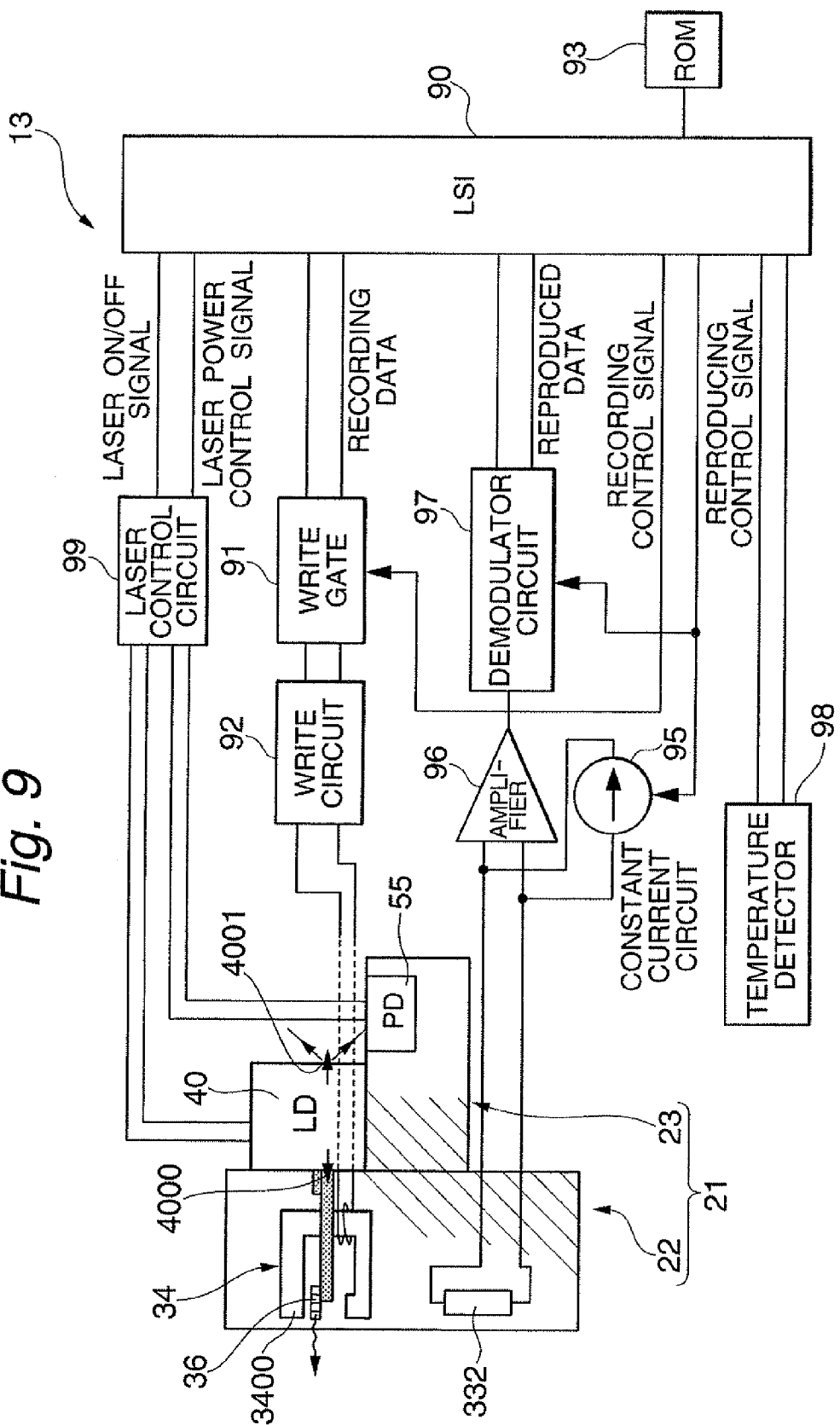
FIG. 9 shows a block diagram illustrating the circuit structure of the recording/reproducing and light-emission control circuit of the magnetic disk apparatus shown in FIG. 6.

FIG. 9 shows a block diagram illustrating the circuit structure of the recording/reproducing and light-emission control circuit 13 of the magnetic disk apparatus shown in FIG. 6.

According to FIG. 9, reference numeral 90 indicates a control LSI, 91 indicates a write gate for receiving recording data from the control LSI 90, 92 indicates a write circuit, 93 indicates a ROM that stores a control table or the like for controlling the value of operating current supplied to the laser diode 40, 95 indicates a constant current circuit for supplying sense current to the MR element 33, 96 indicates an amplifier for amplifying the output voltage from the MR element 33, 97 indicates a demodulator circuit for outputting reproduced data to the control LSI 90, 98 indicates a temperature detector, and 99 indicates a control circuit for controlling the laser diode 40, respectively.

The recording data outputted from the control LSI 90 is supplied to the write gate 91. The write gate 91 supplies recording data to the write circuit 92 only when a recording control signal outputted from the control LSI 90 instructs a write operation. The write circuit 92 applies write current according to this recording data to the write coil layer 343, and then a write operation is performed onto the magnetic disk 10 with write field generated from the main magnetic pole 3400. Further, a constant current flows from the constant current circuit 95 into the MR multilayer 332 only when the reproducing control signal outputted from the control LSI 90 instructs a read operation. The signal reproduced by the MR element 33 is amplified by the amplifier 96, demodulated by the demodulator circuit 97, and then, the obtained reproduced data is outputted to the control LSI 90.

A laser control circuit 99 receives a laser ON/OFF signal and a laser power control signal that are outputted from the control LSI 90. When the laser ON/OFF signal indicates an ON operation, an operating current greater than or equal to an oscillation threshold is applied to a laser diode 40. This causes the laser diode 40 to emit light and the emitted laser light propagates through a spot-size converter 43 and a waveguide 35 to become coupled to a surface-plasmon generator 36 in a surface plasmon mode. As a result, NF-light is emitted from the end of the surface-plasmon generator 36, and is applied to the magnetic recording layer of the magnetic disk 10 to heat the magnetic recording layer.

The operating current is controlled to a value that causes the laser diode 40 to emit laser light with an intensity specified by the laser power control signal. Specifically, a photodiode section 55 measures and monitors the output from the rear light-emission center 4001 of the laser diode 40 and sends a monitoring output (measured value) to the laser control circuit 99. The laser control circuit 99 uses the measured value to make feedback adjustment for controlling the operating current applied to the laser diode 40 to cause the laser diode 40 to emit laser light with the intensity specified by the laser power control signal from the light-emission center 4000.

For the feedback adjustment, preferably the relationship between the intensity of laser light emitted from the light-emission center 4000 of the laser diode 40 and the monitoring output from the photodiode section 55 which receives laser light emitted from the rear light-emission center 4001 is determined in advance. In the laser diode 40 of edge-emitting type, the ratio of the light output intensity from the rear light-emission center 4001 and the light output intensity from the light-emission center 4000 is set to be in the range, for example, from 2% to 25% depending on the design of the diode structure. Therefore, the relation between the light output intensity from the light-emission center 4000 and the monitoring output from the photodiode section 55 can be obtained by clarifying the relation between the light output intensity from the rear light-emission center 4001 and the monitoring output from the photodiode section 55.

The control LSI 90 generates the laser ON/OFF signal according to the timing of recording/reproducing operations, and determines the value of the laser power control signal by referring the value of temperature in the magnetic recording layer of the magnetic disk or the like, which is measured by the temperature detector 98, based on the control table in the ROM 93. Here, the control table may include data about the relationship between the operating current value and the mount of temperature increase due to thermal-assist operation in the magnetic recording layer, and data about the temperature dependence of the anisotropic magnetic field (coercive force) of the magnetic recording layer, as well as data about the temperature dependences of the oscillation threshold value and the characteristics of light output power vs. operating current. Thus, by providing the system of the laser ON/OFF signal and the laser power control signal independently from the recording/reproducing control signal system, it becomes possible to realize not only a current supply to the laser diode 40 linked simply with the recording operation but also more diversified current supply modes.

Obviously, the circuit structure of the recording/reproducing and light-emission control circuit 13 is not limited to the structure shown in FIG. 9. It is also possible to specify write and read operations by using signals other than the recording control signal and reproducing control signal.

As has been described above, the light source unit 23 according to the present invention includes the photodiode section 55 which enables constant monitoring of light output from the laser diode 40. Accordingly, feedback adjustment of light output of the laser diode 40 that emits light for thermal assist can be accomplished. Light output from the laser diode 40 can be controlled by the adjustment in response to changes in the light output due to environmental influence or changes in the light output over time to stabilize the intensity of light for thermal assist with which a magnetic recording medium is irradiated. Consequently, a region of the magnetic recording medium where data is to be written can be properly and stably heated. Therefore, a good thermally-assisted magnetic recording can be accomplished.

Furthermore, the photodiode section 55 is formed inside the unit substrate 230 and the light-receiving portion 550 is located on the source-installation surface 2302 side of the unit substrate 230 so that the light-receiving portion 550 can receive laser light emitted from the rear light-emission center 4001 of the laser diode 40. Accordingly, the rear light-emission center 4001 and the light-receiving portion 550 can be located sufficiently close to each other so that light output from the laser diode 40 can be monitored with a higher efficiency. In addition, since the monitoring system is contained inside the unit substrate 230 in the light source unit 23, the light source unit 23 has a less irregular general outline. This can avoid increase of air resistance of the thermally-assisted magnetic recording head 21 which would significantly disturb an air current around the head 21 while the head 21 is flying above the magnetic disk 10.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thermally-assisted magnetic recording head in which a slider including an optical system configured to propagate light for thermal assist and provided in an element-integration surface of a slider substrate is joined with a light source unit, the light source unit comprising:
    a unit substrate including: a joining surface which faces the slider substrate when the light source unit is joined with the slider; and a source-installation surface adjacent to the joining surface;
    a light source having a light-emission center and a rear light-emission center on a side opposite to the light-emission center, which is provided on the source-installation surface and emits light for thermal assist to be entered into the optical system from the light emission center; and
    a photodetector section, being a semiconductor photodiode structure formed of a portion of the unit substrate and being included within the unit substrate, configured to measure an output from the light source based on light emitted from the rear light-emission center, a light-receiving portion of the photodetector section being located in the source-installation surface of the unit substrate and directly facing the rear light-emission center of the light source to receive the light emitted from the rear light-emission center,
    a back surface of the slider substrate on a side opposite to an opposed-to-medium surface being joined to the joining surface of the unit substrate so that the light emitted from the light-emission center directly enters the optical system.

2. The thermally-assisted magnetic recording head as claimed in claim 1, wherein the photodetector section is located on a rear side of the light source when viewed from the joining surface side of the unit substrate.

3. The thermally-assisted magnetic recording head as claimed in claim 1, wherein the photodetector section is a PIN-type photodiode formed from a portion of the unit substrate.

4. The thermally-assisted magnetic recording head as claimed in claim 1, wherein an electrode connected electrically to a p-type semiconductor portion of the photodetector section and an electrode connected electrically to a n-type semiconductor portion of the photodetector section are provided in the source-installation surface of the unit substrate.

5. The thermally-assisted magnetic recording head as claimed in claim 1, wherein the light source is an edge-emitting type laser diode, and a p-type electrode of the light source is bonded in the source-installation surface of the unit substrate.

6. The thermally-assisted magnetic recording head as claimed in claim 5, wherein an electrode connected electrically to the p-type electrode of the light source is provided in the source-installation surface of the unit substrate.

7. The thermally-assisted magnetic recording head as claimed in claim 1, wherein an adhesion layer for joining to the slider is provided in the joining surface of the unit substrate.

8. The thermally-assisted magnetic recording head as claimed in claim 1, wherein an insulating layer for electrically insulating the unit substrate from the slider substrate is provided on the back surface of the slider substrate on the side opposite to the opposed-to-medium surface.

9. The thermally-assisted magnetic recording head as claimed in claim 8, wherein the insulating layer covers a light-receiving end surface of the optical system and functions as an antireflection means for light incident in the optical system from the light source.

10. A head gimbal assembly comprising: a suspension; and the thermally-assisted magnetic recording head as claimed in claim 1 fixed on the suspension,
a portion of the back surface of the slider substrate on the side opposite to the opposed-to-medium surface being bonded to the suspension, the suspension comprising an aperture, and the light source unit protruding through the aperture on a side opposite to the slider with respect to the suspension.

11. The head gimbal assembly as claimed in claim 10, wherein a wiring member for the light source and the photodetector section of the light source unit is provided on a surface of the suspension, and a wiring member for a write head element in the slider is provided on another surface of the suspension.

12. A magnetic recording apparatus comprising: at least one head gimbal assembly as claimed in claim 10; at least one magnetic recording medium; and a control circuit configured to control light-emission operations of the light source by using a monitor output from the photodetector section, and to control write operations that the thermally-assisted magnetic recording head performs to the at least one magnetic recording medium.

13. The thermally-assisted magnetic recording head as claimed in claim 1, wherein the source-installation surface and the joining surface are non-parallel.

14. The thermally-assisted magnetic recording head as claimed in claim 1, wherein the plane formed by the source-installation surface and the plane formed by the joining surface intersect.

* * * * *